United States Patent
Benson

(10) Patent No.: US 6,581,384 B1
(45) Date of Patent: Jun. 24, 2003

(54) COOLING AND HEATING APPARATUS AND PROCESS UTILIZING WASTE HEAT AND METHOD OF CONTROL

(76) Inventor: Dwayne M. Benson, 1714 S. Torre Molinos Cir., Tempe, AZ (US) 85281

( * ) Notice: Subject to any disclaimer, the term of this patent is extended or adjusted under 35 U.S.C. 154(b) by 0 days.

(21) Appl. No.: 10/016,512

(22) Filed: Dec. 10, 2001

(51) Int. Cl.[7] .................................................. F01K 7/34
(52) U.S. Cl. ........................... 60/653; 60/660; 60/670
(58) Field of Search ........................... 60/653, 670, 660

(56) References Cited

U.S. PATENT DOCUMENTS

| | | | |
|---|---|---|---|
| 1,871,244 A | 8/1932 | Steuart | |
| 2,511,716 A | 6/1950 | Katzow | 62/115 |
| 2,875,589 A | 3/1959 | Horn | 62/87 |
| 3,153,442 A | 10/1964 | Silvern | 165/50 |
| 3,877,218 A * | 4/1975 | Nebgen | 60/39.55 |
| 3,882,671 A * | 5/1975 | Nebgen | 252/373 |
| 4,118,934 A | 10/1978 | Brola | 60/647 |
| 4,271,679 A | 6/1981 | Schäfer | 62/238 |
| 4,984,432 A * | 1/1991 | Corey | 417/69 |
| 5,628,203 A * | 5/1997 | Adolph et al. | 165/48.1 |

* cited by examiner

Primary Examiner—Hoang Nguyen

(57) ABSTRACT

The present invention provides a process and apparatus for utilizing waste heat to power a reconfigurable thermodynamic cycle that can be used to selectively cool or heat an environmentally controlled space, such as a room or a building. The present invention also provides a method of controlling the system, while allowing large variations in the heat input energy rate. The system provides a design which reasonably balances the need to maximize efficiency, while also keeping the design cost effective.

9 Claims, 5 Drawing Sheets

COOLING AND HEATING APPARATUS AND PROCESS UTILIZING WASTE HEAT AND METHOD OF CONTROL

CROSS-REFERENCE TO RELATED APPLICATIONS

None.

FEDERALLY SPONSORED RESEARCH AND DEVELOPMENT

Not applicable.

BACKGROUND OF THE INVENTION

This invention relates to a method of utilizing a low temperature heat source, typically less than 500° F. (260° C.), to drive a thermodynamic cycle which can be used to either heat or cool an environmentally controlled space, such as a building.

Many industrial processes produce waste heat of low temperature, such that little useful work is generally accomplished with this waste heat. It is well known that certain thermodynamic cycles, such as absorption refrigeration, can provide environmental cooling even from low grade heat sources, such as thermal solar, gas turbine engine exhaust, and bottoming cycles for industrial steam generators, but absorption cooling suffers from low efficiencies. In addition, some processes, such as thermal solar, cannot generate sufficiently high temperatures to drive typical thermodynamic cycles, without expensive concentrating and collecting systems, thus requiring the system coefficient of performance to be as high as possible, in order to minimize collector cost.

Prior art has produced various combinations of thermodynamic cycles providing heating andor cooling. None have maximized the efficiency achievable with such a cycle. Some systems pass all fluid through a gas compressor, requiring substantially more power than pressurizing a liquid (Katzow, 2,511,716). Other approaches either do not regenerate heat from the working fluid (Steuart, 1,871,244) or do not regenerate heat in a fashion that maximizes the temperature of the working fluid entering the heating device (Brola, 4,118,934). Some systems do not absorb heat from the outside atmosphere as part of the heating cycle (Brola, 4,118,934), limiting the coefficient of performance to one or less. Some systems attempt to only provide heating (Schafer, 4,271,679) or cooling (Horn, 2,875,589) but not both. Some add complexity by using separate working fluids for the power and heat pump cycles (Silvern, 3,153,442) (Schafer, 4,271,679). None provide a simple, yet flexible, method of control, such that the system can be controlled over a wide range of heat input energy.

Hence, there is a need for a single system of sufficient efficiency and simplicity to make the manufacture and operation economically attractive. Since the intent of the system is to operate off waste heat, the heating and cooling system must be flexible enough to accommodate variable heat energy input and allow simple controls with a minimum of sensors and actuators.

SUMMARY OF THE INVENTION

The present invention provides a process and apparatus for utilizing waste heat to power a reconfigurable thermodynamic cycle that can be used to selectively cool or heat an environmentally controlled space, such as a room or a building. The present invention also provides a method of controlling the system, while allowing large variations in the heat input rate. The system provides a design which reasonably balances the need to maximize efficiency, while also keeping the design cost effective.

The thermodynamic cycle of this invention is a combination of a Rankine cycle to provide power and a refrigeration and heating cycle, conmmonly known as a heat pump. When in the heating mode, coefficients of performance greater than one can be achieved by this system. This means that this process will transfer more heat to the desired environmentally controlled space, than if the waste heat were used directly to heat the same space.

The system uses a single working fluid in both liquid and gaseous phases. The advantage of a single working fluid is that it eliminates the need for dynamic seals between the rotating mechanical components, thus allowing a hermetically sealed system similar to most air conditioning systems in current use. The working fluid has desirable properties of low critical point pressure (<1000 psia) and temperature (<300° F.). Several common refrigerants are candidate working fluids.

While not a requirement to make the system function, using supercritical conditions in the Rankine cycle can have a significant impact on the overall system efficiency. This effect is recognized when looking at the pressure-enthalpy and temperature-entropy characteristics of several refrigerants. At highly superheated temperatures, greater amounts of work can be extracted from the fluid for a given pressure ratio than at lower temperatures. Operating at supercritical pressures allows the greatest pressure drop across the prime mover as possible. But operating at these conditions leaves an excessive amount of energy remaining in the fluid being exhausted from the prime mover. Thus to maximize efficiency, the excess energy must be recovered and used to preheat the working fluid, commonly called regeneration. Operating at supercritical conditions and regeneration are the two key elements to maximizing the system coefficient of performance.

In one embodiment of the present invention, and by way of example only, the environmental cooling is provided as follows: The liquid refrigerant is pressurized to supercritical pressure, a heater raises the fluid temperature to superheated conditions, the fluid is passed through a prime mover of the gas expander type, and the expander exhaust is flowed through the first of two regenerators to preheat the liquid refrigerant prior to entering the heater. The expander is mechanically coupled to a compressor which pressurizes the refrigerant in vapor phase from a low pressure vapor to a vapor at the same pressure as the expander outlet. The outlet of the first regenerator and the compressor outlet are combined and passed through a second regenerator prior to the combined fluid entering a condenser. Within the condenser, the vapor is cooled to a liquid phase. A portion of the condensed liquid is passed through an expansion valve and through an evaporator, where the building air is cooled. The vaporized low pressure refrigerant is then returned to the inlet of the compressor. The remainder of the liquid refrigerant that did not pass through the expansion valve is returned to the high pressure pump to be once again pressurized, preheated by the two regenerators, and returned to the heater.

The present invention also develops a method of control for the heating and cooling apparatus, allowing for required system flexibility with a minimum of sensors and actuators. Because the heat input may be variable and uncontrolled, the system controls must have the flexibility to accommodate any set of heating temperatures and heat input rates. This means the load on the system must be controlled to match the input power. Plus, based on prior discussions on maximizing pressure and temperature to achieve maximum work out of the prime mover, control laws are presented which can be used to optimize the power cycle operating point based on input power and achievable working fluid temperatures.

Environmental heating is accomplished in an almost identical fashion, with the exception that the working fluid is vaporized by exposing the evaporator to ambient atmospheric conditions and heat is rejected to the environmentally controlled space from the condenser.

OBJECTS AND ADVANTAGES

Accordingly, besides the objects and advantages of the cooling and heating apparatus described above, several objects and advantages of the present invention are:

(a) to provide cooling and heating apparatus and process which is powered by heat energy from low temperature, waste heat sources, such as thermal solar, gas turbine engine exhaust, residual energy from steam generators, or any one of many other similar sources.

(b) to provide a cooling and heating system which can accommodate variable amounts of input energy and wide variation of temperature of that input energy.

(c) to provide maximum efficiency in both cooling and heating modes for a system which is a combined cooling and heating system and which utilizes waste heat.

(d) to provide a means for achieving maximum temperature of the pre-heated working fluid, prior to entering the primary heater.

(e) to provide a cooling and heating system which is simple in design and, therefore, is more cost effective to manufacture.

(f) to provide a system which is easy to control, requiring a minimum number of sensors and actuators.

(g) to provide a system which requires a minimum of actuation devices to transform the system from cooling mode to heating mode and vice-versa.

(h) to provide, for a waste-heat driven cooling and heating system, a control algorithm which can operate the system at near optimum performance while accommodating a wide range of operating conditions and continuously varying operating conditions, including start-up and shut-down transients.

The novel features which are believed to be characteristic of the invention, both as to its organization, method of operation, and control, together with further objects and advantages thereof will be better understood from the following description, when considered in connection with the accompanying drawings in which a presently preferred embodiment of the invention is illustrated by way of example. It is expressly understood, however, that the drawings are for the purpose of illustration and description only, and is not intended as a definition of the limits of the invention.

BRIEF DESCRIPTION OF THE DRAWINGS

FIG. 3 is a thermodynamic process map showing the various stages of the thermodynamic process for cooling using the refrigerant R-134a.

FIG. 4 is a thermodynamic process map showing the various stages of the thermodynamic process for cooling using the refrigerant R-134a.

DETAILED DESCRIPTION OF VARIOUS EMBODIMENTS

Figure 1:
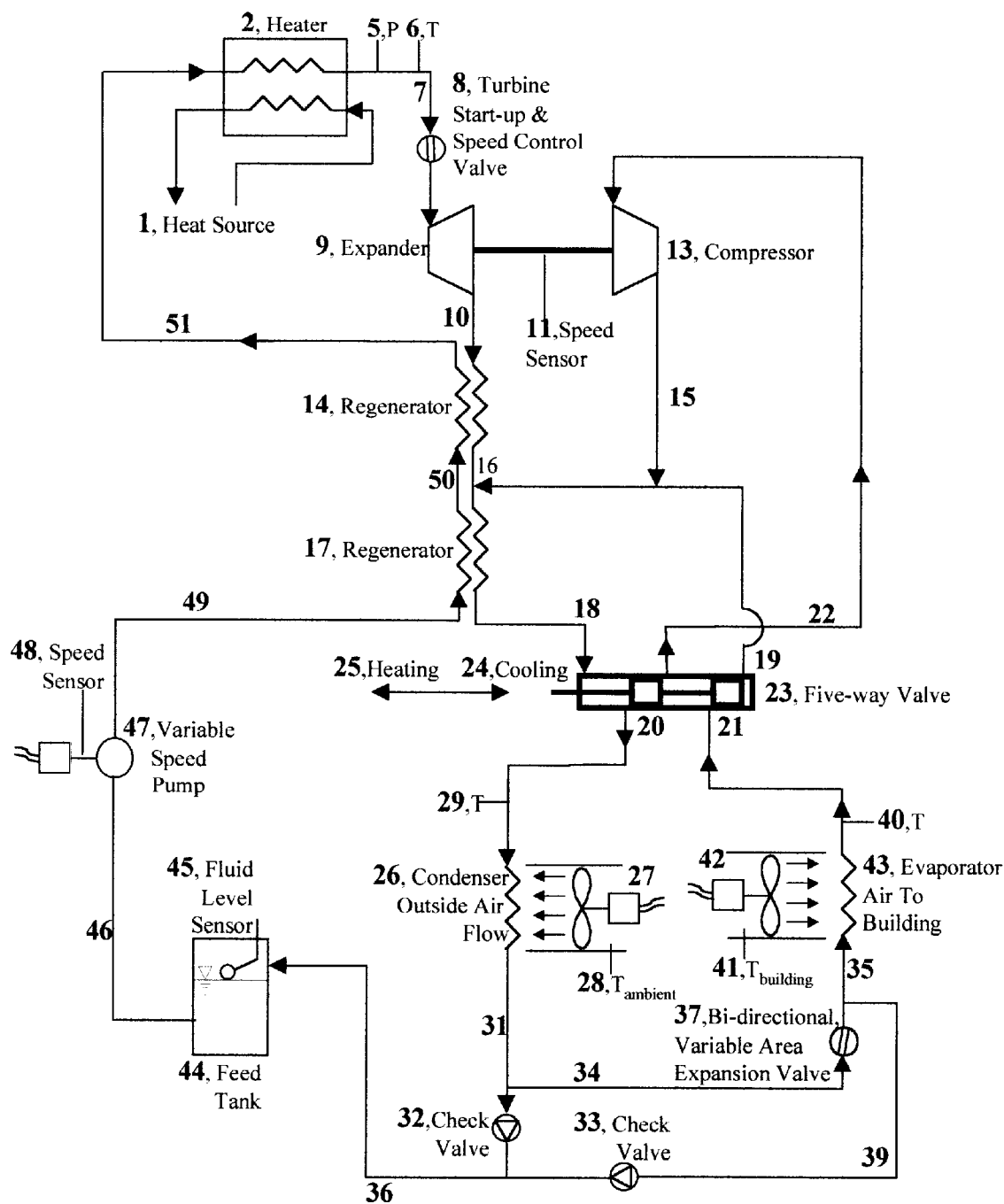
FIG. 1 is a diagrammatic view of the apparatus as configured for cooling an environmentally controlled space.

In one embodiment of the invention as illustrated in FIG. 1, the apparatus is configured in the preferred embodiment for the cooling mode and consists of a working fluid which has a low critical pressure and temperature, such as a common refrigerant, and a liquid pump 47, which pressurizes the refrigerant from an intermediate pressure liquid to a high pressure liquid. The high pressure liquid passes through conduit 49 to the first regenerator 17 to become preheated, and then passes through conduit 50 to regenerator 14 to become additionally preheated prior to passing through conduit 51 to the heater 2, where a heat source superheats the working fluid. A pressure sensor 5 and a temperature sensor 6 provide the heater outlet conditions to the controller for use in the control laws. The working fluid passes through the expander start-up and overspeed control valve 8 to the expander 9. The superheated vapor is expanded through the expander 9, which may be a turbine, piston motor, or some other device which could extract work from the working fluid. While passing through the expander 9, work is extracted from the working fluid, which is still superheated upon exiting the expander 9 into conduit 10. The expander 9 drives a compressor 13 through a common shaft, where a speed sensor 11 transmits the speed of the expander 9 and compressor 13 rotating group back to the controller to use in the speed control logic.

The expander exhaust 10 passes to regenerator 17, where much of the heat is transferred from the expander exhaust gas to the liquid entering conduit 51. The compressor 13, using the same working fluid as the expander 9, compresses the working fluid from a low pressure, gaseous state to an intermediate pressure gas as part of a typical refrigeration cycle. The output from the compressor 15 is co-mingled with the outlet of the first regenerator 14 in conduit 16. The combined outlet flows from the expander 9 and first regenerator 14 is then passed into regenerator 17 to extract as much heat from the working fluid as possible. The working fluid then passes through conduit 18 through the five-way reversing valve 23 to conduit 20 and through heat exchanger 26, which is acting as a condenser and is shown in FIG. 1 to be using a fan 27 to move ambient air directly across the condenser coils. In an alternative embodiment, the condenser may be cooled by an externally chilled fluid as would be supplied by an evaporative type chiller.

The working fluid exits the condenser 26 through conduit 31 as a intermediate pressure liquid and is split, where part of the liquid passes through conduit 34 and the bi-directional, variable area expansion valve 37. Upon exiting the expansion valve 37, the intermediate pressure liquid becomes a low pressure liquid. The low pressure liquid passes through conduit 35 and enters heat exchanger 43, which is being used as an evaporator and is shown in FIG.

1 to directly cool the building air being forced across the evaporator coils by fan 42. In an alternative embodiment, the evaporator may be used to cool another fluid, rather than directly cooling a building. Evaporator exit temperature sensor 40 and building air temperature sensor 41 are used by the controller to control the compressor load. The working fluid leaving the evaporator 43 is a low pressure vapor and is passed through conduit 21, through the five-way reversing valve 23 and into conduit 22, where the working fluid returns to the compressor 13. Conduit 19 is not used. The remainder of the working fluid not passing through the expansion valve 37 instead passes through check valve 32 into conduit 36. Check valve 33 is checked closed. The intermediate pressure liquid in conduit 36 enters a refrigerant feed tank 44, where any residual vapor is separated from the liquid before entering conduit 46 and returning to the high pressure liquid pump 47. A fluid level sensor 45 in the refrigerant feed tank 44 monitors the system refrigerant charge and allows the system controller to shut down the high pressure pump 47 and expander 9, if the liquid-gas interface lowers to the level where the vapor enters conduit 46.

Figure 2:
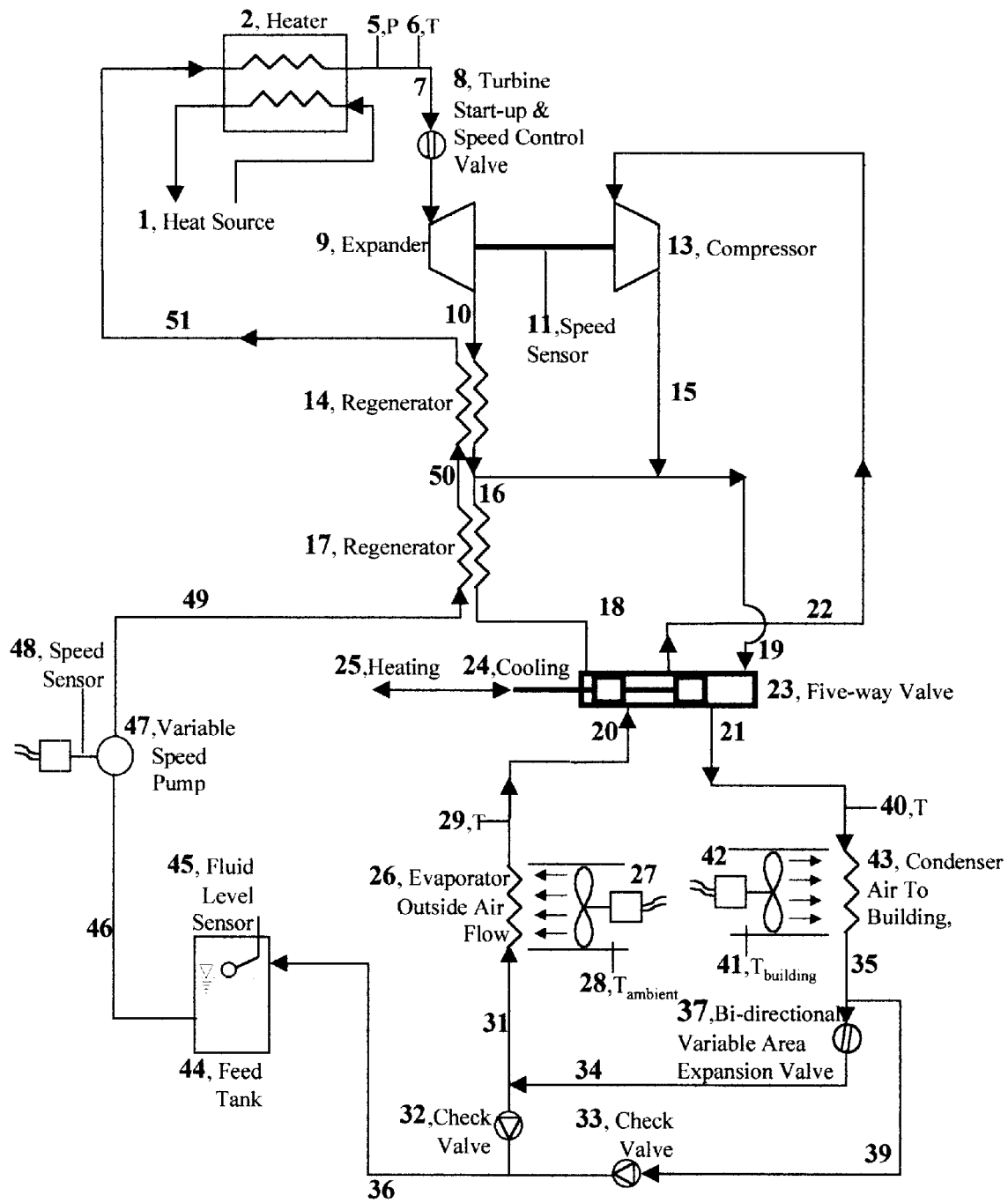
FIG. 2 is a diagrammatic view of the apparatus as configured for heating an environmentally controlled space.

In FIG. 2, the apparatus is configured in the preferred embodiment for the heating mode. All functions of the system, unless noted below are the same as in FIG. 1. Differences from FIG. 1 include passing directly through conduit 19 to the five-way reversing valve 23 the combined flow from regenerator 17 and compressor outlet 15. Regenerator 17 and conduit 18 are not used. The intermediate pressure gas from conduit 19 leaves the five-way reversing valve 23 and passes through conduit 21 and through heat exchanger 43, which is acting as a condenser, and is shown in FIG. 2, in one embodiment, to be using a fan 42 to move the building air directly across the condenser coils.

The working fluid exits the condenser through conduit 35 as a intermediate pressure liquid and is split where part of the liquid passes through the variable area, bidirectional expansion valve 37 and conduit 34. The intermediate pressure liquid becomes a low pressure liquid, upon exiting the expansion valve 37. The low pressure liquid passes through conduit 31 and enters heat exchanger 26, which is being used as an evaporator, and is shown in FIG. 2, in one embodiment, to be directly heated by outside ambient air being forced across the evaporator coils by fan 27. Evaporator exit temperature sensor 29 and outside air temperature sensor 28 are used by the controller to control the compressor load. The working fluid leaving the evaporator is a low pressure vapor and is passed through conduit 20, through the five-way reversing valve 23 and into conduit 22, where the working fluid returns to the compressor 13. The remainder of the working fluid not passing through the expansion valve 37 instead passes through check valve 33 into conduit 36. Check valve 32 is checked closed. As in the cooling mode, the intermediate pressure liquid in conduit 36 enters a refrigerant feed tank 44, where any residual vapor is separated from the liquid before entering conduit 46 and returning to the high pressure liquid pump 47.

OPERATION

Figure 3:
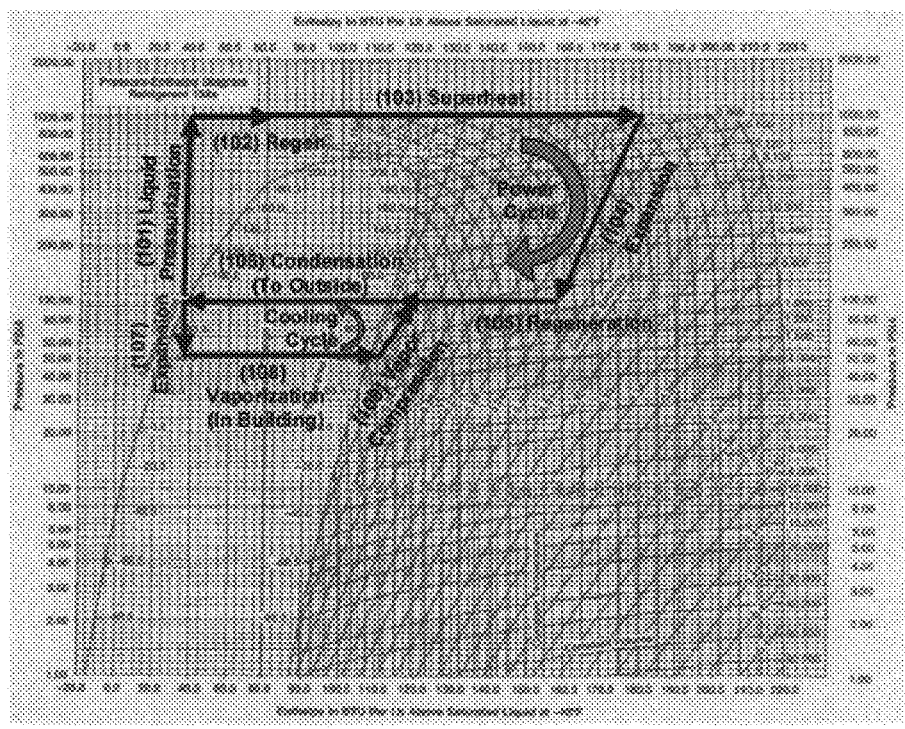

FIG. 3 illustrates the binary cycle for cooling on the pressure-enthalpy graph for a typical refrigerant. The liquid refrigerant is pumped to a supercritical pressure in process 101, where the working fluid is preheated by regenerators 17 and 14, then superheated to a 400° F. as it passes through the heater 2 in process 103. The working fluid is then expanded through the expander 9 in process 104 and exits the expander 9 as a lower pressure, but still superheated vapor. Process 105 recovers the excess heat from the expander exhaust 10 using regenerator 14, such that the enthalpy of the fluid is similar to that of the compressor outlet 15. Regenerator 17 heat recovery process is not shown in FIG. 3, but would reduce the working fluid enthalpy close to that of the saturated vapor enthalpy at the condenser pressure. The combined flow from regenerator 14 and the compressor outlet 15 are condensed in process 106 by either ambient air or an externally chilled fluid. In one embodiment, the condenser is cooled by chilled water from an evaporative type water chiller. The liquid working fluid from the condenser 26 is then passed through expansion valve 37 during process 107 and vaporized during process 108 by passing the working fluid through the evaporator 43. The heat of vaporization for process 108 is provided by the circulation of the air from the space to be conditioned or an intermediate fluid used for heat transfer, thus providing a cooling effect on the conditioned space. To keep the efficiency of the entire process high, it is desirable to maximize the work recovered in process 104 and minimize the amount of work input in the refrigerant vapor compression process 109. As shown in FIG. 3, for each mass unit of fluid circulating through the power cycle, 3 mass units of refrigerant are circulated in the cooling cycle. The useful heat transfer is provide only by the cooling refrigerant in the vaporization process 108.

Figure 4:
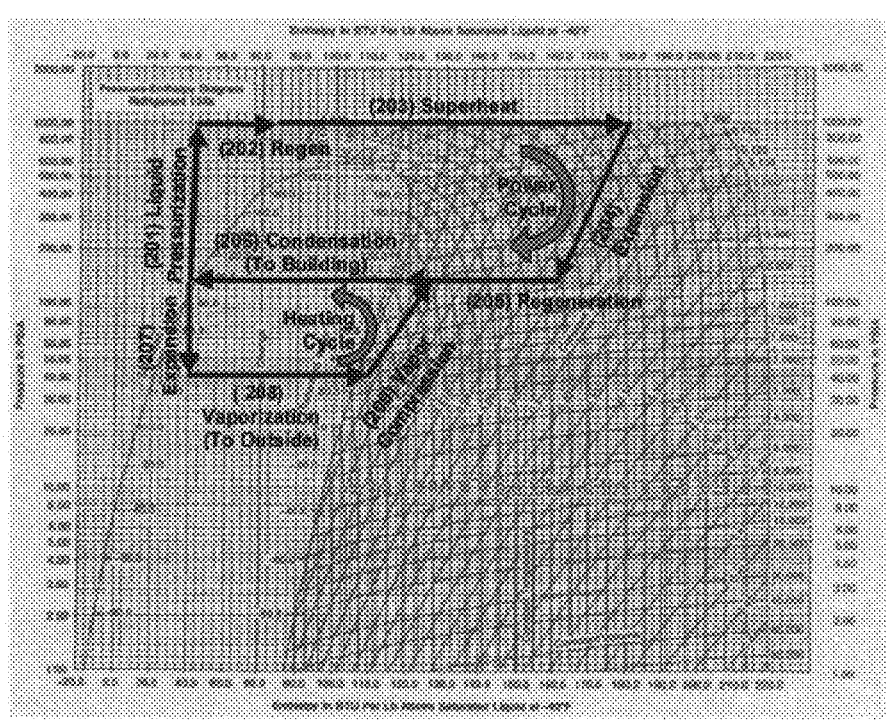

FIG. 4 illustrates the binary cycle for heating on the pressure-enthalpy graph for a typical refrigerant. The cycles between FIG. 3 and FIG. 4 are almost identical. The primary difference is that the useful heat transfer provided by the system comes from the condensation process 206 being applied to the combined fluid flow from both the power and heating cycles. As illustrated, note that the vapor compression process 209 shown in FIG. 4 requires almost twice as much work input as the cooling cycle process 109 of FIG. 3, yet both the heating and cooling cycles have an almost identical coefficient of performance. This is because useful heat is being transferred from both the power cycle fluid and heating cycle fluid during the condensation process 206 when the system is in heating mode, but the only useful heat transfer occurring when the system is in cooling mode comes from the cooling cycle fluid during the vaporization process 108.

Figure 5:
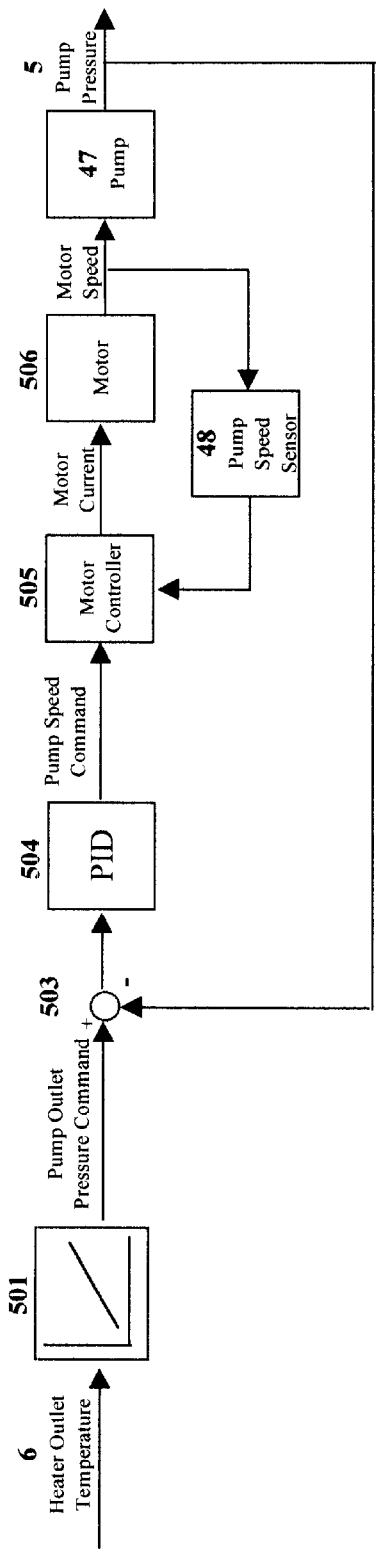
FIG. 5 is a block diagram showing the control logic for a variable pressure, liquid pump control loop.

FIG. 5 is a block diagram of the pump pressure control loop. The primary function of the pump pressure control loop is to vary the speed of the pump 47 in order to maintain the desired pump outlet pressure based on pressure sensor 5. The commanded pressure is dependent on the achievable outlet temperature from the heater as measured by temperature sensor 6. Based on FIG. 3, it can be seen that as entropy increases, the slope of the constant entropy line decreases, and that greater amounts of recoverable work from the expander can be achieved at higher entropy for a given pressure ratio across the expander. Therefore, an optimum operating pressure 501 exists for each heater outlet temperature, which can be programmed into the control logic. A proportional-integral-derivative (PID) 503 control is used to appropriately gain and add the dynamics necessary to maintain a tight pressure control loop An inner control loop on motor speed, which uses pump speed sensor 48, provides a means to indirectly control pressure rise rate in the heater.

Figure 6:
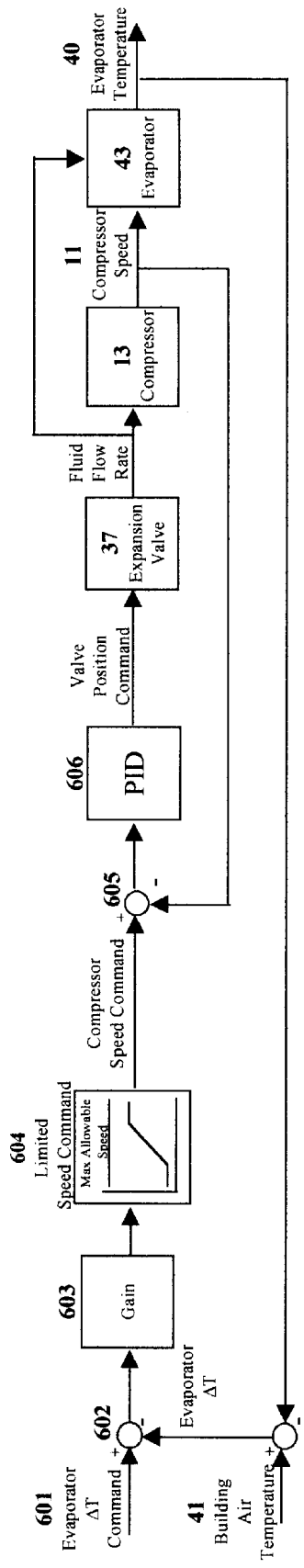
FIG. 6 is a block diagram showing the logic for controlling the compressor load.

FIG. 6 is a block diagram of the compressor load control loop in cooling mode. Since the input energy supplied by the heater 2 may be variable, the load applied to the compressor must be adjusted to match the power created at the expander output shaft. This function is achieved by modulating the expansion valve 37 position. In the case of operating in the cooling mode, a desired evaporator ΔT command 601 is compared 602 to the difference 607 between the evaporator outlet temperature 40 and the building air temperature 41. In the heating mode, the temperature difference calculation 607 is between the evaporator 28 and the outside air temperature 26. The working fluid is desired to have a lower temperature at the evaporator outlet than the building air temperature, as an indication that the evaporator is working at full capacity. The error calculation 602 is used to create a limited-range compressor speed command 604, which is compared 605 to the compressor speed sensor 11 measurement and modified by PID compensation dynamics 606 to create a valve position command. Since the inner and outer loops of the control logic have competing objectives, they will tend to find an equilibrium point. As an illustrative example, if the expansion valve 37 opens too far, the compressor speed 11 will drop below the minimum allowed by the speed command block 604, and the speed control loop will drive the valve closed until the compressor 11 reaches the minimum design speed. If enough expander 9 power is available to drive the compressor speed 11 to the maximum limit defined in the speed command block 604, then the expansion valve 37 will open to maintain the compressor speed 11 within the target speed range, and the ΔT between the evaporator outlet temperature 40 and the building air temperature 41 may exceed the ΔT defined by the evaporator ΔT command 601.

There is a maximum safe speed at which the compressor may operate. Combining these two constraints creates a desired range of operating speeds within which the expansion valve 37 maintains the compressor speed. The compressor speed command block 604 may also be used to define an optimal speed setting for each given pressure ratio across the compressor 13, which may yield an optimal power or efficiency operating point. In the preferred embodiment, the expansion valve 37 is initially closed and opens to load the compressor 13, once the compressor reaches the defined operating speed range in the speed command block 604.

Figure 7:
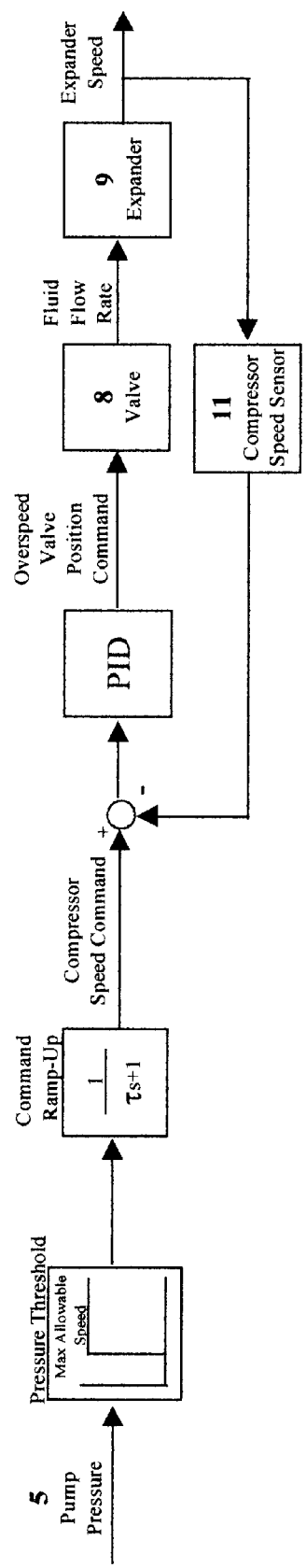
FIG. 7 is a block diagram showing the logic for controlling system start-up and preventing expander overspeed.

FIG. 7 is a block diagram of the start-up and expander overspeed control loop. Upon start-up, the controller monitors the pump pressure 5 and issues a maximum safe operating speed command, if the pump pressure exceeds an minimum threshold 701. The start-up speed command is slowly ramped up by use of a first order lag 702. As the start-up and overspeed control valve ramps open, the compressor load control loop will become operational and maintain the expander speed below the maximum allowable, thus causing the proportional-integral-derivative control (PID) 704 to drive the start-up and overspeed control valve 8 to saturate full open as long as the expander speed remains below the maximum allowable. The only time the start-up and overspeed control valve 8 is modulated from the full open position during system operation is when the compressor speed 11 exceeds the maximum allowable speed set by the threshold block 701. The maximum speed set by the threshold block 701 is set sufficiently above the operating speed range used by the expansion valve control loop in FIG. 6 to avoid control loop interaction. In an alternate embodiment, an overspeed condition can signal the pump pressure control loop, FIG. 5, to reduce pressure and thereby reduce expander 9 power and compressor speed 11.

CONCLUSION, RAMIFICATION, AND SCOPE

The present invention provides a process and apparatus for utilizing waste heat to power a reconfigurable thermodynamic cycle that can be used to selectively cool or heat an environmentally controlled space, such as a room or a building. The present invention also provides a method of controlling the system, while allowing large variations in the amount of heat input energy rate and the temperature of the heat source. The system provides a design which reasonably balances the need to maximize efficiency, while also keeping the design cost effective.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. An apparatus for heating and cooling, comprising:

pump means for pressurizing an intermediate pressure liquid to create a high pressure liquid;

heater means for heating said high pressure liquid to a superheated fluid;

expander means for expanding said superheated fluid, creating an intermediate pressure gas;

first heat exchanger means for a first energy transfer from said intermediate pressure gas from the expander outlet to said high pressure liquid, creating an intermediate temperature, intermediate pressure gas;

compressor, operatively connected to said expander, means for compressing the working fluid from a low pressure gas to a pressure equal to the outlet of said first heat exchanger;

second heat exchanger means of condensing the combined fluid streams from said first heat exchanger and said compressor by energy transfer to a second fluid of lower temperature, creating said intermediate pressure liquid, expansion valve means of expanding said intermediate pressure liquid to create a low pressure liquid, third heat exchanger means of vaporizing said low pressure liquid by energy transfer from a third fluid, creating a desired cooling effect in said third fluid;

reversing valve means of reversing said condensing and said vaporization processes to create a desired heating effect in said third fluid.

2. The apparatus according to claim 1 further comprising:

pressure controller means for controlling the pressure of said supercritical liquid, having a pressure sensor and first temperature sensor;

compressor load controller means for controlling the speed of said compressor, having a speed sensor on the compressor or some attachment thereof, a second temperature sensor means of measuring said low pressure gas temperature, and a third temperature sensor means of measuring said third fluid temperature, in the case of cooling said third fluid, or a fourth temperature sensor means of measuring said second fluid temperature, in the case of heating said third fluid;

start-up algorithm means for providing a controlled acceleration of said expander and said compressor during start-up;

overspeed algorithm means for preventing overspeed of said expander and said compressor.

3. The apparatus according to claim 1 further comprising:
fourth heat exchanger means for energy transfer from the combined fluid of said first heat exchanger and said compressor output to said high pressure liquid.

4. apparatus for heating and cooling comprising: a working fluid capable of both gas and liquid phases over the operating range of pressures and temperatures, a high pressure liquid pump, a heater using an external heat source, a first conduit connecting said pump to said heater, a gas expander type prime mover, a second conduit connecting said heater to said prime mover, a first heat exchanger between the outlet of said prime mover and said first conduit, a gas compressor, a common shaft which connects said prime mover to said compressor, a third conduit connecting said first heat exchanger hot-side outlet and said compressor outlet to a reversing valve or valves, a fourth conduit connecting said reversing valve or valves to a second heat exchanger, said second heat exchanger is operatively between a lower temperature second fluid and said fourth conduit, a fifth conduit between said second heat exchanger and a first check valve, a sixth conduit between said fifth conduit and a flow restriction to the working fluid, a seventh conduit between said flow restriction and a third heat exchanger, said third heat exchanger is operatively between the seventh conduit and a third fluid, which is the fluid that is desirably heated or cooled, an eighth conduit between the seventh conduit and a second check valve, a ninth conduit from both said first check valve and said second check valve to said high pressure liquid pump, a tenth conduit conducting the working fluid between said third heat exchanger and said reversing valve or valves, an eleventh conduit from said reversing valve or valves to said compressor.

5. The apparatus according to claim 4 further comprising:
a liquid feed tank means between said ninth conduit and said high pressure liquid pump to separate liquid and residual gas phases of said working fluid.

6. The apparatus according to claim 4 further comprising:
a four-way reversing valve means for reversing the condensing and vaporizing functions of said second heat exchanger and said third heat exchanger.

7. The apparatus according to claim 4 further comprising:
a fourth heat exchanger means of transferring heat from said third conduit to said first conduit, and which is used only during the operating mode in which said third fluid is cooled;

a single five-way reversing valve means for reversing the condensing and vaporizing functions of said second heat exchanger and said third heat exchanger.

8. the apparatus according to claim 4 further comprising:
a twelfth conduit conducting said second fluid from a chiller of the evaporative type to said second heat exchanger, and a thirteenth conduit conducting said second fluid from said second heat exchanger to said chiller.

9. The apparatus according to claim 4 further comprising:
a variable flow-rate pump means of controlling the pressure of said working fluid to said heater.

* * * * *